(12) United States Patent
Balasubramanian et al.

(10) Patent No.: US 11,929,776 B2
(45) Date of Patent: Mar. 12, 2024

(54) METHOD AND SYSTEM FOR SWITCHING BETWEEN HALF DUPLEX AND FULL DUPLEX IN MULTI-TRP SYSTEMS

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 17/156,173

(22) Filed: Jan. 22, 2021

(65) Prior Publication Data

US 2022/0239329 A1   Jul. 28, 2022

(51) Int. Cl.
| | |
|---|---|
| *H04B 1/44* | (2006.01) |
| *H04L 5/16* | (2006.01) |
| *H04W 8/00* | (2009.01) |
| *H04W 72/20* | (2023.01) |
| *H04L 5/00* | (2006.01) |
| *H04L 5/14* | (2006.01) |

(52) U.S. Cl.
CPC ............... *H04B 1/44* (2013.01); *H04L 5/16* (2013.01); *H04W 8/005* (2013.01); *H04W 72/20* (2023.01); *H04L 5/0069* (2013.01); *H04L 5/14* (2013.01)

(58) Field of Classification Search
CPC ... H04B 1/40; H04B 1/44; H04B 5/00; H04B 5/16; H04B 7/18545; H04B 7/47; H04B 10/114; H04W 8/00; H04W 8/005; H04W 8/08; H04W 72/02; H04W 72/04; H04W 72/406; H04L 5/0001; H04L 5/14; H04L 5/413; H04L 5/0069
See application file for complete search history.

(56) References Cited

U.S. PATENT DOCUMENTS

| | | | | |
|---|---|---|---|---|
| 5,787,364 A | * | 7/1998 | Exner ................. | H04M 11/066 379/100.06 |
| 8,462,671 B2 | * | 6/2013 | Rinne .................... | H04B 1/44 370/278 |

(Continued)

FOREIGN PATENT DOCUMENTS

| | | | | |
|---|---|---|---|---|
| CN | 111182542 | * | 5/2020 | ............ H04W 12/06 |
| EP | 3139656 A1 | | 3/2017 | |

(Continued)

OTHER PUBLICATIONS

International Search Report and Written Opinion—PCT/US2021/063874—ISA/EPO—dated Apr. 26, 2022.

*Primary Examiner* — Warner Wong
(74) *Attorney, Agent, or Firm* — Procopio, Cory, Hargreaves & Savitch LLP

(57) ABSTRACT

A configuration to allow a wireless device having one or more TRPs to configure the one or more TRPs based on configurations of other wireless devices. The apparatus detects a second wireless device in a vicinity of a first wireless device. The apparatus determines a duplex configuration of the second wireless device. The apparatus enables a duplex configuration of the first wireless device to correspond with the duplex configuration of the second wireless device. The apparatus communicates with the second wireless device based on the duplex configuration.

28 Claims, 12 Drawing Sheets

(56) References Cited

U.S. PATENT DOCUMENTS

| | | | |
|---|---|---|---|
| 9,385,795 B1 * | 7/2016 | Ananthanarayanan | H04B 1/0057 |
| 2009/0190558 A1 * | 7/2009 | Strutt | H04L 1/0019 370/332 |
| 2009/0296609 A1 | 12/2009 | Choi et al. | |
| 2010/0034123 A1 * | 2/2010 | Razdan | H04W 4/10 370/277 |
| 2010/0202329 A1 * | 8/2010 | Nishioka | H04L 5/14 370/296 |
| 2014/0016524 A1 * | 1/2014 | Choi | H04L 5/16 370/281 |
| 2014/0221009 A1 * | 8/2014 | Liu | H04W 64/00 455/456.1 |
| 2014/0273850 A1 * | 9/2014 | Park | H04W 76/14 455/41.2 |
| 2014/0328228 A1 * | 11/2014 | Park | H04W 72/048 370/280 |
| 2016/0080433 A1 * | 3/2016 | Liu | H04M 1/72412 370/261 |
| 2016/0128009 A1 * | 5/2016 | Yoon | H04W 56/001 370/350 |
| 2016/0174272 A1 * | 6/2016 | Rabii | H04W 8/005 455/422.1 |
| 2017/0048741 A1 * | 2/2017 | Lee | H04W 76/10 |
| 2018/0007724 A1 | 1/2018 | Kazmi et al. | |
| 2018/0026777 A1 * | 1/2018 | Su | H04L 5/16 370/252 |
| 2018/0212746 A1 * | 7/2018 | Kazmi | H04L 1/1825 |
| 2020/0045697 A1 * | 2/2020 | Choi | H04W 72/042 |
| 2020/0396599 A1 | 12/2020 | Luo et al. | |

FOREIGN PATENT DOCUMENTS

| | | | | |
|---|---|---|---|---|
| EP | 3243358 A1 | | 11/2017 | |
| GB | 2365275 | * | 2/2002 | H04B 7/26 |
| GB | 2498559 | * | 7/2013 | H04L 5/16 |
| WO | WO2007004010 | * | 1/2007 | H04L 29/06 |
| WO | 2020198616 A1 | | 10/2020 | |
| WO | 2020252417 A1 | | 12/2020 | |
| WO | WO2022084372 | * | 4/2022 | H04W 72/04 |

* cited by examiner

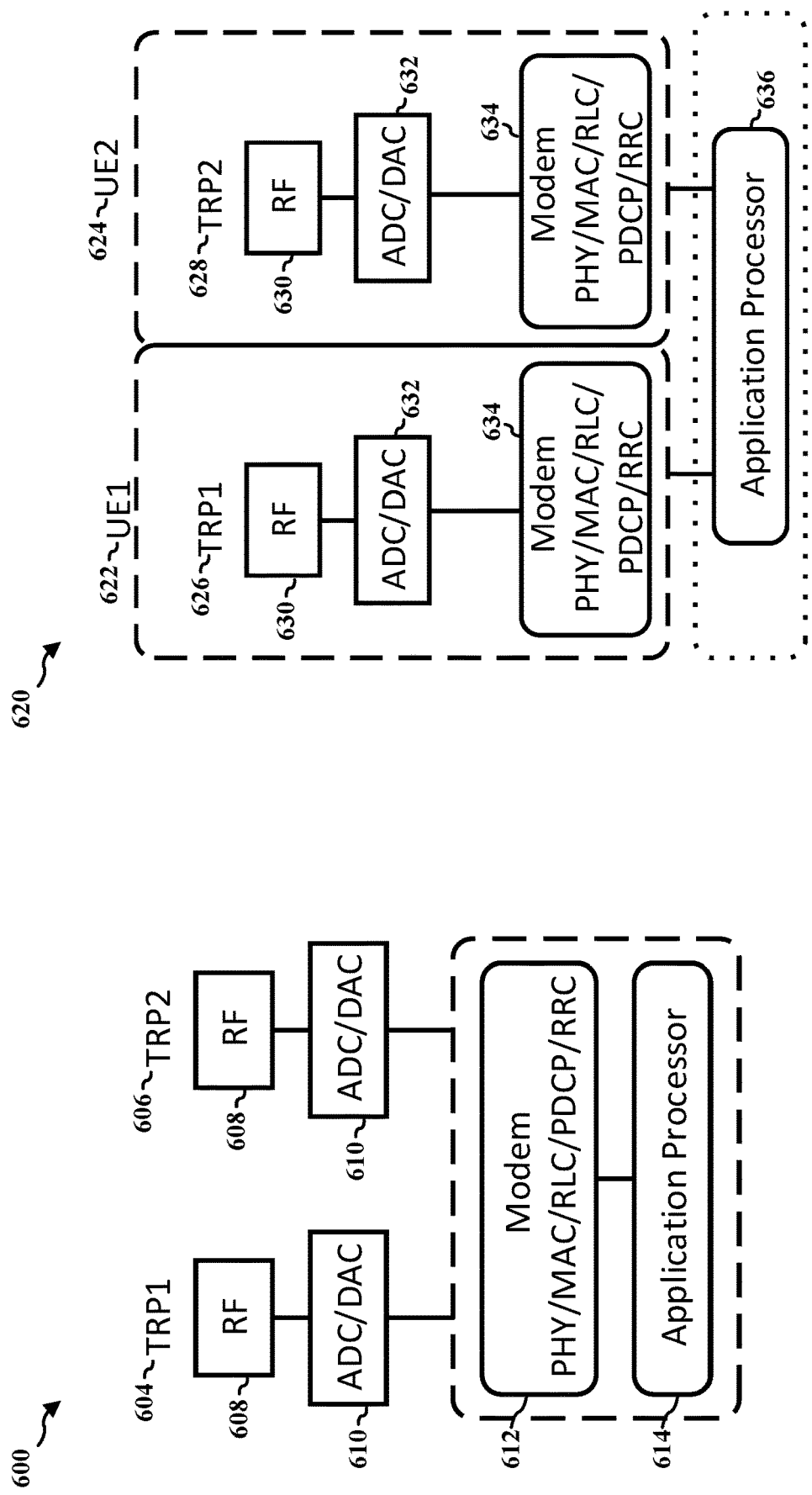

METHOD AND SYSTEM FOR SWITCHING BETWEEN HALF DUPLEX AND FULL DUPLEX IN MULTI-TRP SYSTEMS

BACKGROUND

Technical Field

The present disclosure relates generally to communication systems, and more particularly, a configuration for switching between half duplex and full duplex in multi transmission reception point (TRP) systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first wireless device. The device may be a processor and/or a modem at a first wireless device or the first wireless device itself. The apparatus detects a second wireless device in a vicinity of a first wireless device. The apparatus determines a duplex configuration of the second wireless device. The apparatus enables a duplex configuration of the first wireless device to correspond with the duplex configuration of the second wireless device. The apparatus communicates with the second wireless device based on the duplex configuration.

In an aspect of the disclosure, a method, a computer-readable medium, and an apparatus are provided. The apparatus may be a device at a second wireless device. The device may be a processor and/or a modem at a second wireless device or the second wireless device itself. The apparatus receives, from a first wireless device, a duplex capability of the first wireless device. The apparatus transmits, to the first wireless device, a request to operate in a duplex configuration supported by the first wireless device. The apparatus enables a duplex configuration of a second wireless device to correspond with the duplex configuration supported by the first wireless device. The apparatus communicates with the first wireless device based on the duplex configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A is a diagram illustrating an example of a full duplex architecture for an mTRP device.

FIG. 6B is a diagram illustrating an example of a half duplex architecture for an mTRP device.

DETAILED DESCRIPTION

Figure 1:
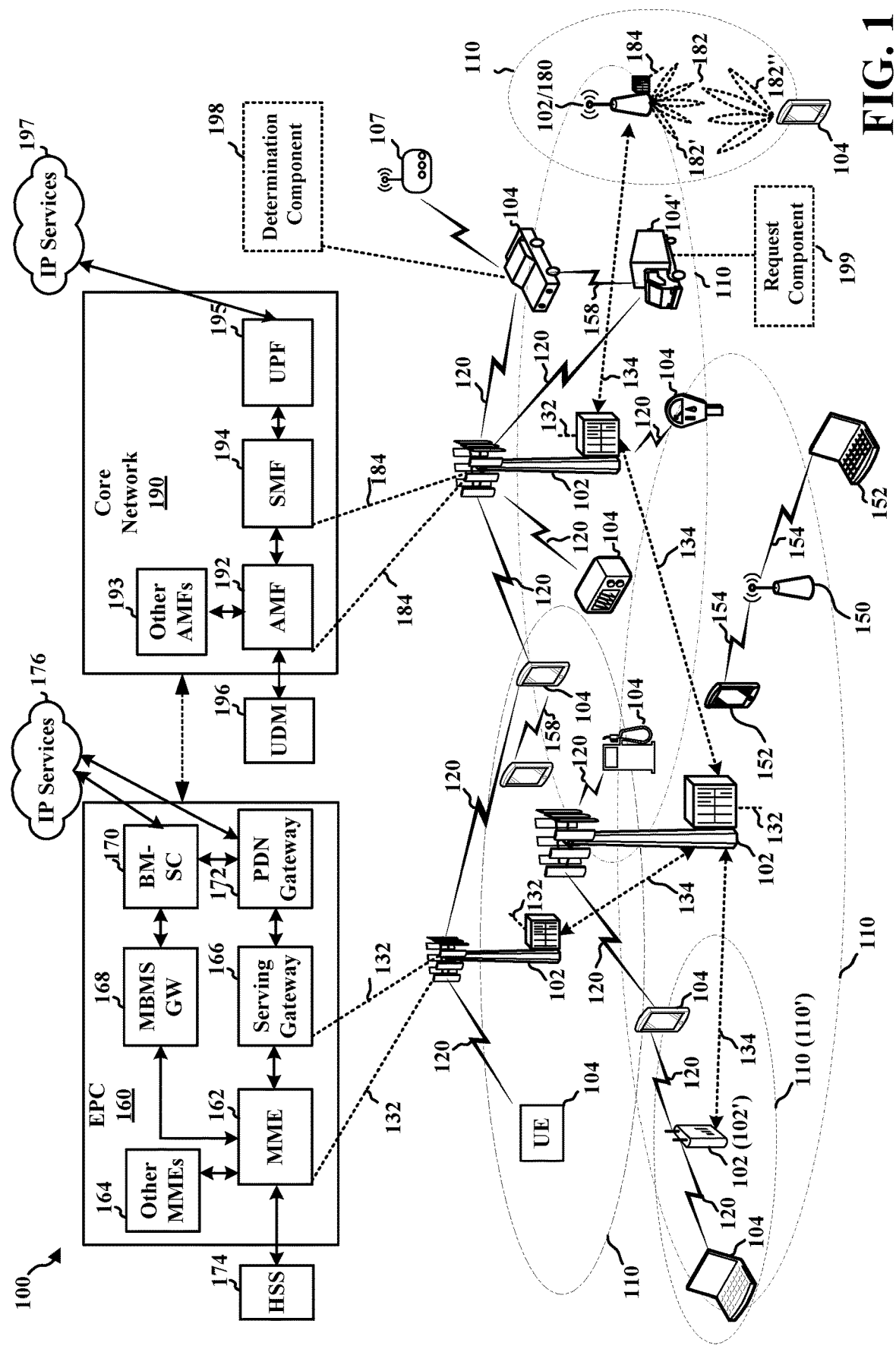
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming similarly may be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may be configured to determine a duplex configuration of a second wireless device (e.g., UE 104') that may be within the vicinity of the UE 104. For example, the UE 104 may comprise a determination component 198 configured to determine the duplex configuration of the UE 104'. The UE 104 detects a UE 104' in a vicinity of the UE 104. The UE 104 determines a duplex configuration of the UE 104'. The UE 104 enables a duplex configuration of the UE 104 to correspond with the duplex configuration of the UE 104'. The UE 104 communicates with the UE 104' based on the duplex configuration.

Referring again to FIG. 1, in certain aspects, the UE 104' may be configured to request to communicate with a first wireless device (e.g., UE 104) in a configuration that is supported by the UE 104. For example, the UE 104 may comprise a request component 199 configured to transmit a request to communicate with the UE 104. The UE 104' receives, from the UE 104, a duplex capability of the UE 104. The UE 104' transmits, to the UE 104, a request to operate in a duplex configuration supported by the UE 104. The UE 104' enables a duplex configuration of the UE 104' to correspond with the duplex configuration supported by the UE 104. The UE 104' communicates with the UE 104 based on the duplex configuration.

Figure 2:
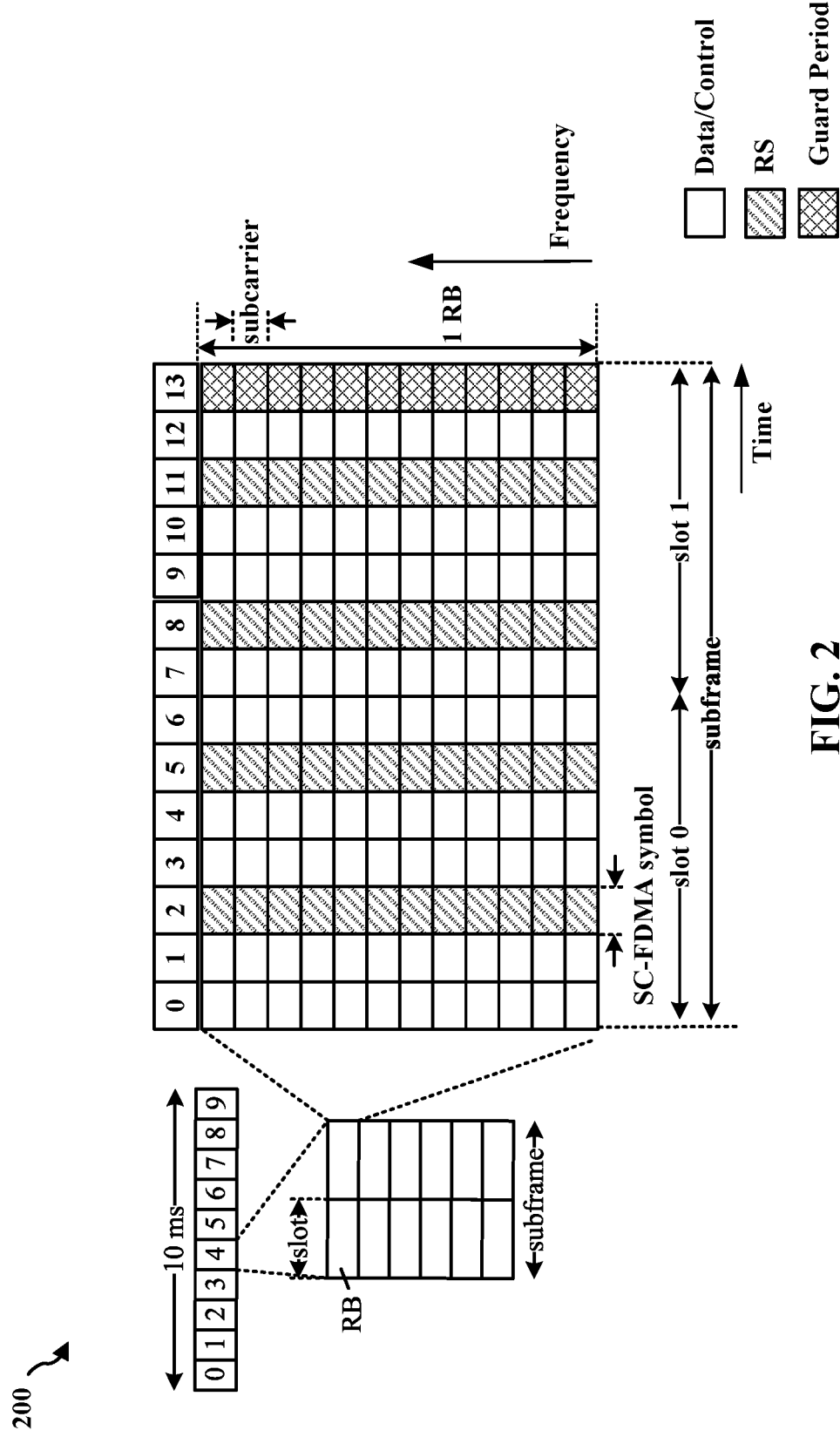
FIG. 2 illustrate example aspects of a sidelink slot structure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3:
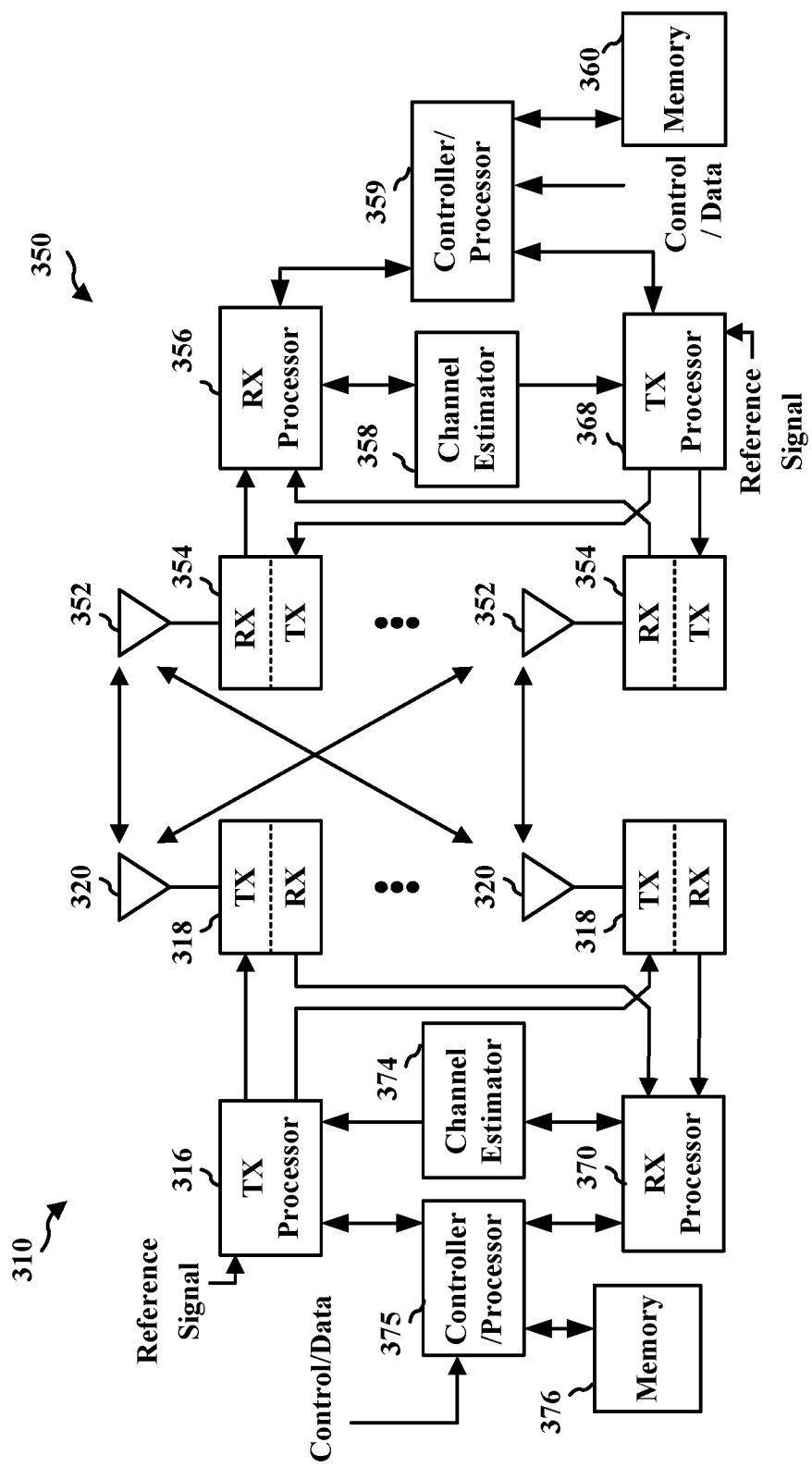
FIG. 3 is a diagram illustrating an example of a first device and a second device involved in wireless communication based, e.g., on V2V, V2X, and/or device-to-device communication.

FIG. 3 is a block diagram of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 or 199 of FIG. 1.

Figure 4:
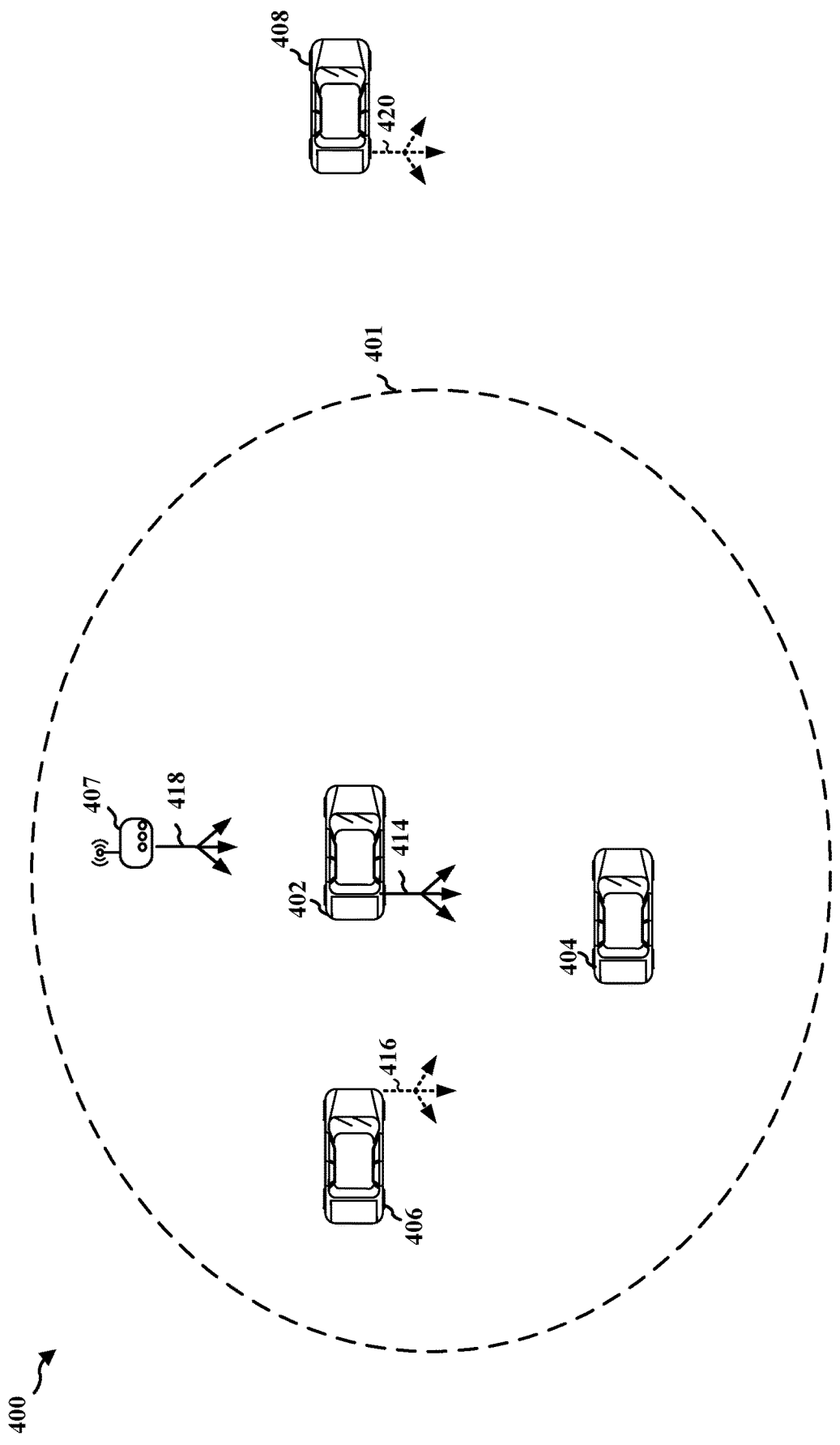
FIG. 4 is a diagram illustrating an example of a first device and a second device involved in wireless communication based, e.g., on sidelink communication.

FIG. 4 illustrates an example 400 of wireless communication between devices based on sidelink communication, such as V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit communication to UEs 402, 404, 406, 408.

UE 402, 404, 406, 408 or RSU 407 may comprise a determination component, similar to 198 described in connection with FIG. 1.

Figure 5A:
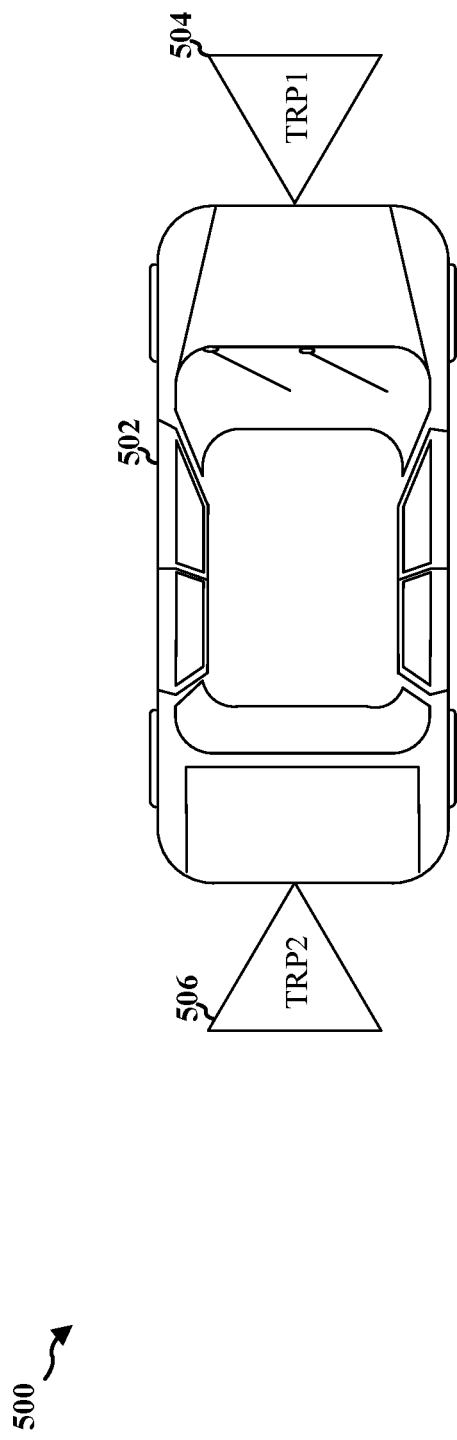
FIG. 5A is a diagram illustrating an example of a multi-TRP (mTRP) device.

Multi TRP (mTRP) systems may have the flexibility to provide or adapt radio coverage by installing transmission points based on need. Generally, baseband processing may be performed in a centralized unit and RF processing may be performed near the transmission points. A vehicle UE (VUE) may be a natural candidate where mTRP systems may be installed. For example, a VUE may include a TRP installed at the front of the vehicle and may include another TRP installed at the rear of the vehicle, as shown for example in the diagram 500 of FIG. 5A. The VUE 502 may be include TRPs installed in different locations of the vehicle and the disclosure is not intended to be limited to the examples disclosed herein.

Figure 5C:
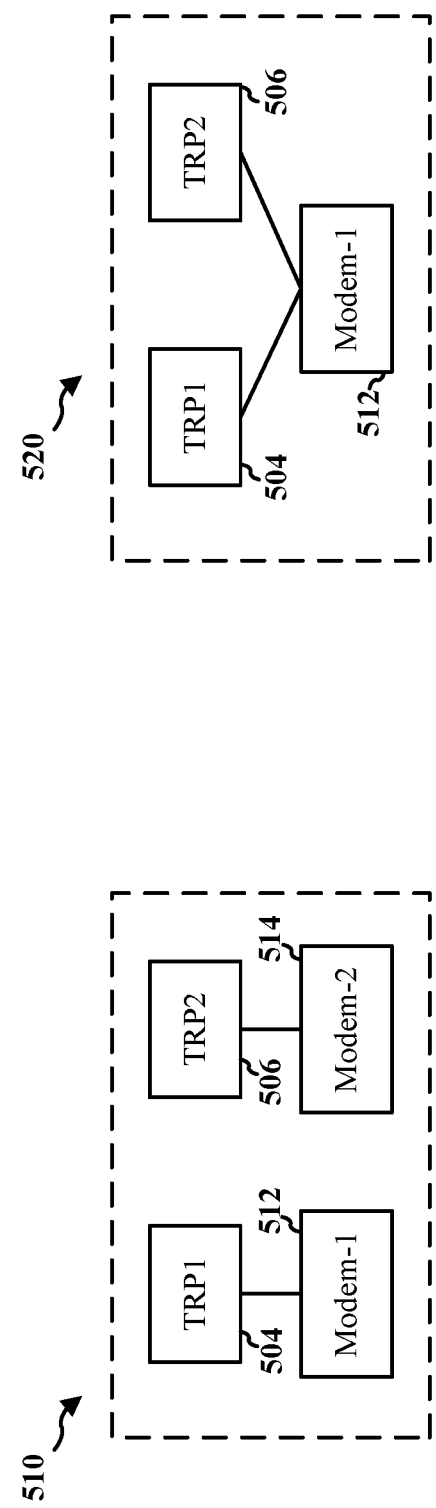
FIGS. 5B and 5C are diagrams illustrating example architectures of an mTRP device.
Figure 5B:
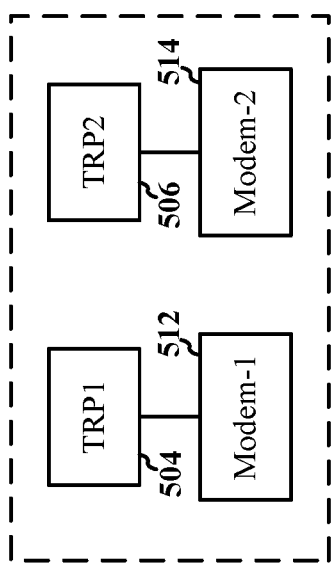

In some instances, each TRP 504, 506 may have its own modem 512, 514, as shown for example in diagram 510 of FIG. 5B. In instances where each TRP 504, 506 has its own modem 512, 514, the VUE 502 may have multiple distributed units. In some instances, the TRPs 504, 506 may share a central unit or common modem 512, as shown for example in diagram 520 of FIG. 5C. Multiple TRPs and multiple modems panels may offer flexibility in allowing the wireless device or UE to be able to operate either as two independent UEs (e.g., 510) or as one UE (e.g., 520).

In situations where the VUE 502 finds another VUE that also has a plurality of TRPs, the VUE 502 may behave or communicate with the other VUE however the VUE 502 wants. However, the VUE 502 (or other wireless devices) having a plurality of TRPs may not be efficiently communicate with a wireless device that does not have a plurality of TRPs. Aspects presented herein provide a configuration to allow a wireless device having a plurality of TRPs (e.g., VUE 502) to adjust or modify its configuration in instances where the wireless device having the plurality of TRPs communicates with a wireless device that does not have a plurality of TRPs and/or a plurality of modems.

In some instances, a wireless device may comprise one or more TRP with one or more modems. The wireless device may be configured to reconfigure itself to operate as a full duplex wireless device or a half duplex wireless device for communication with differently configured wireless devices. In some instances, a wireless device may utilize the one or more TRPs and the one or more modems to operate as one or more independent half duplex wireless devices. The wireless device may utilize the one or more TRPs and the one or more modems to operate as the one or more independent half duplex wireless devices (e.g., UE or VUE) in instances where half duplex wireless devices (e.g., UE or VUE) are in the vicinity of the wireless device. In some instances, a wireless device may utilize two or more TRPs and two or more modems to operate as a full duplex wireless device (e.g., UE or VUE) in instances where there may be one or more full duplex wireless devices are in the vicinity of the wireless device. At least one advantage of the disclosure is that the wireless device may increase its spectral efficiency by utilizing the two or more TRPs and the two or more modems to operate as the full duplex wireless device. In some instances, a first wireless device comprising multiple TRPs may instruct a second wireless device comprising multiple TRPs to change from a half duplex mode to a full duplex mode. In some instances, the instructions from the first wireless device to the second wireless device may enable the second wireless device to configure itself similarly as the first wireless device. For example, the instructions may instruct the second wireless device to switch from a multiple half duplex configuration to a single full duplex configuration.

FIG. 6A illustrates a diagram 600 of a full duplex architecture for an mTRP UE. The mTRP UE of FIG. 6A may comprise two mTRP panels which includes a first TRP TRP1 604 and a second TRP TRP2 606. TRP1 604 includes an RF processor 608 and a converter 610 configured to convert analog to digital and digital to analog signals. TRP2 606 also includes an RF processor 608 and a converter 610. The TRP1 604 and the TRP2 606 share a common modem 612 and a common application processor 614. In some aspects, the mTRP UE of FIG. 6A may behave as one full duplex UE. For example, the full duplex UE may use one TRP (e.g., TRP1 604) as a transmit panel, while using the other TRP (e.g., TRP2 606) as a receive panel with the common modem 612. The entire stack (e.g., PHY, MAC, RLC, PDCP, RRC) may reside within the common modem 612. Resource selection for transmission at the transmission panel (e.g., TRP1 604) may be determined at the PHY of the common modem 612 based on reception at the receive panel (e.g., TRP2 606).

FIG. 6B illustrates a diagram 620 of a half duplex architecture for an mTRP UE. The mTRP UE of FIG. 6B may comprise two mTRP panels which includes a first TRP TRP1 626 and a second TRP TRP2 628, similarly as the mTRP UE of FIG. 6A. TRP1 626 includes an RF processor 630 and a converter 632 configured to convert analog to digital and digital to analog signals. TRP2 628 also includes an RF processor 630 and a converter 632. However, in the mTRP UE of FIG. 6B each of the TRPs have a dedicated modem 634, while sharing a common application processor 636. In some aspects, the mTRP UE of FIG. 6B may behave as two independent half duplex UEs, UE1 622 and UE2 624. For example, the two independent half duplex UEs (e.g., UE1 622, UE2 624) each use one TRP (e.g., TRP1 626, TRP2 628) and a respective modem 634. Both UE1 622 and UE2 624 share the same application processor 636. In some aspects, to balance the load between UE1 622 and UE2 624, the common application processor 636 may route the application traffic into UE1 622 or UE2 624 based on quality of service. Each of the UEs UE1 622, UE2 624 may have their own identifier and may transmit/receive control or data channels. Resource selection or reservation may be performed at the respective modem 634 independently for each of UE1 622 and UE2 624, such that UE1 622 and UE2 624 are independent at a lower layer perspective.

Figure 7:
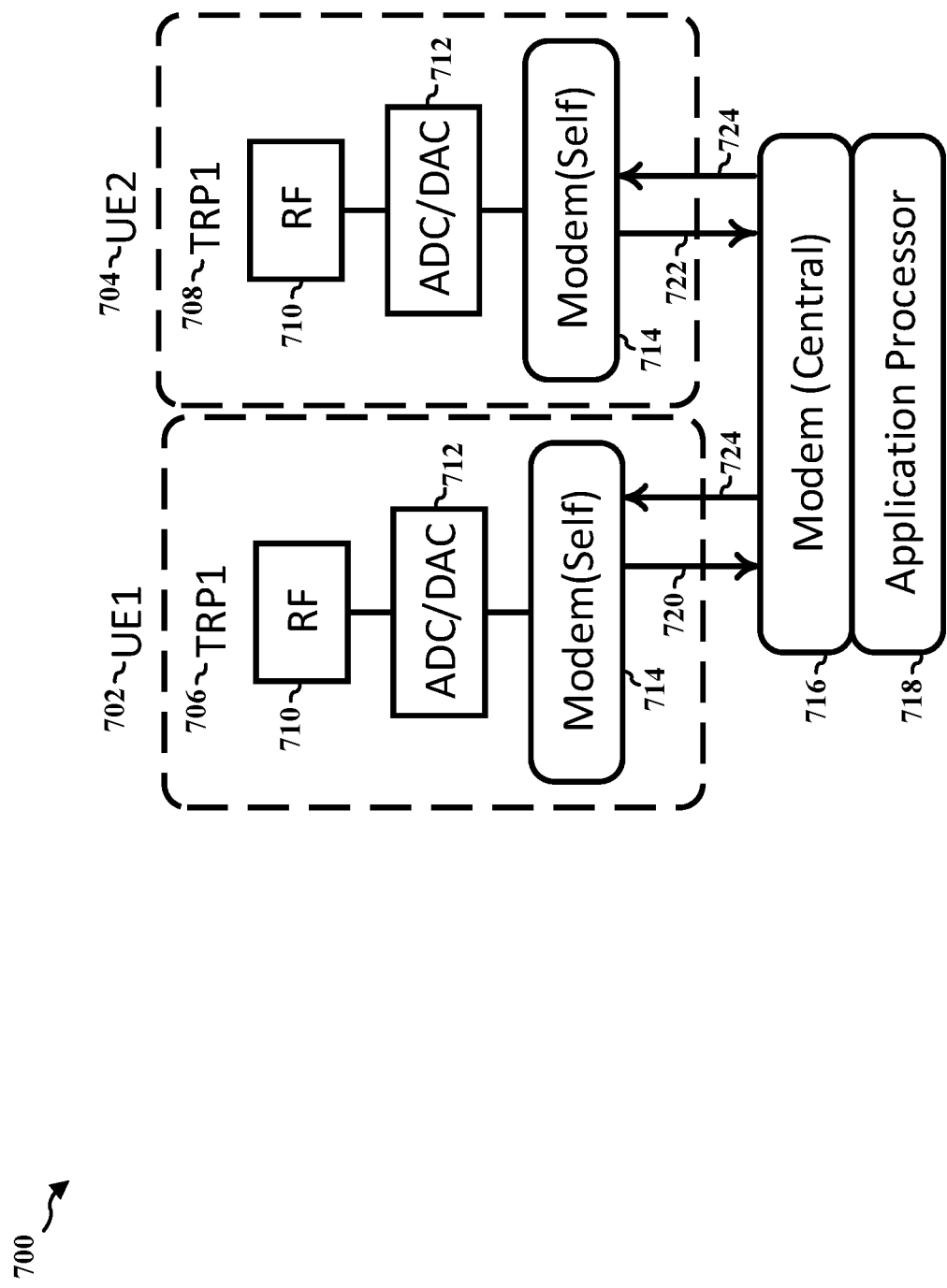
FIG. 7 is a diagram illustrating an example of a half duplex architecture for an mTRP device.

FIG. 7 illustrates a diagram 700 of a half duplex architecture for an mTRP UE. The mTRP UE of FIG. 7 may comprise two mTRP panels which includes a first TRP TRP1 706 and a second TRP TRP2 708. TRP1 706 includes an RF processor 710 and a converter 712 configured to convert analog to digital and digital to analog signals. TRP2 708 also includes an RF processor 710 and a converter 712. However, in the mTRP UE of FIG. 7 each of the TRPs have a dedicated modem 634, while sharing a central modem 716 and common application processor 718. In some aspects, the mTRP UE of FIG. 7 may behave as two independent half duplex UEs, UE1 702 and UE2 704. For example, the two independent half duplex UEs (e.g., UE1 702, UE2 704) each use one TRP (e.g., TRP1 706, TRP2 708) and a respective modem 714. Both UE1 702 and UE2 704 share the same central modem 716 and the same application processor 718. The modem functionality of each UE (e.g., UE1 702 and UE2 704) may be split between the respective modem 714 and the central modem 716.

The self modem or respective modem 714 of each UE may decode the control channel or the data channel. For example, at 720, UE1 702 may decode the control channel and may forward resource reservations and other information decoded from other UEs (e.g., a first set of UEs) to the central modem 716. At 722, UE2 704 may decode the control channel and may forward resource reservation and other information decoded from other UEs (e.g., a second set of UEs) to the central modem 716. The second set of UEs may be the same or different than the first set of UEs. The central modem 716 obtains a global view of available resources from the decoded control channels obtained from UE1 702 and UE2 704. At 724, the central modem 716 provides the recommended resource availability to UE1 702 and UE2 704, in response to the resource reservation requests from UE1 702 and UE2 704. In some instances, the central modem 716 may provide exact resources to be used by UE1 702 and UE2 704 (e.g., based on the application layer load of UE1 702 and UE2 704). In some instances, UE1 702 and UE2 704 may independently select resources from the recommended resource availability provided by the central modem 716. Each UE (e.g., 702, 704) may transmit on such resources independently chosen from the recommended or provided resources specified by the central modem 716. The UEs 702, 704 may operate independently due, in part, to the shared central modem 716 being able to communicate with the UEs 702, 704 at a lower layer. The shared central modem 716 may communicate with the UEs 702, 704 at the lower layer due to the respective modem 714 of each UE. The shared central modem 716 may coordinate with the respective modems 714 of UE1 702 and UE2 704 to ensure that transmissions from the UEs do not collide. For example, the central modem 716 may coordinate with the UEs, such that the two UEs do not select the same or overlapping resources. In some instances, if the resources of the UEs overlap, the central modem 716 may coordinate with the UEs 702, 704, such that beam directions of UE1 702 are different from the beam directions of UE2 704 in instances where resources overlap.

In some aspects, the mTRP of FIG. 7 may be configured to operate in a full duplex operation. For example, UE1 702 may be configured to operate as the transmission chain of the full duplex operation, while UE2 704 may be configured to operate as the receive chain of the full duplex operation (or vice versa). In this configuration, the combination of UE1 702 and UE2 704 may behave as one full duplex UE having a unique identifier, where UE1 702 is the transmission chain and UE2 704 is the receive chain.

Figure 8:
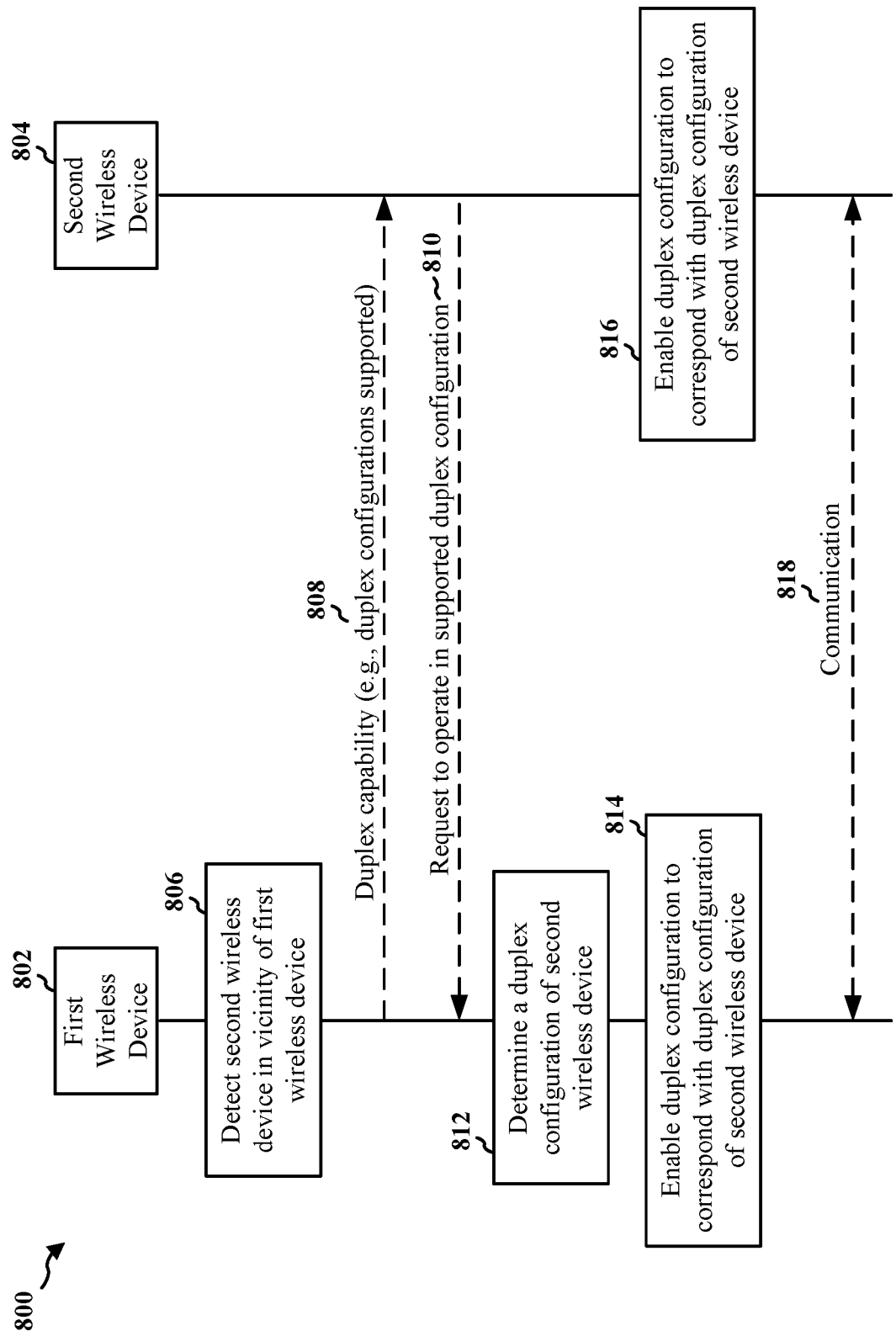
FIG. 8 is a call flow diagram of signaling between a first wireless device and a second wireless device.

FIG. 8 illustrates an example communication flow 800 between a first wireless device 802 and a second wireless device 804. The communication may be based on V2X, V2V, or D2D based communication directly from a transmitting device to a receiving device. The communication transmitting from device 802, 804 may be broadcast and received by multiple receiving devices within range of a particular transmitting device, as described in connection with FIG. 4. The first wireless device 802 may correspond to a first UE or VUE, while the second wireless device 804 may correspond to a second UE or VUE. For example, in the context of FIG. 1, the first wireless device 802 may correspond to at least UE 104, and the second wireless device may correspond to at least 104'. In another example, in the context of FIG. 3, the first wireless device 502 may correspond to the device 350, and the second wireless device 504 may correspond to the device 310.

As illustrated at 806, the first wireless device 802 may detect a second wireless device 804 in a vicinity of the first wireless device 802. The first wireless device 802 may detect the presence of the second wireless device 804 in the vicinity of the first wireless device 802 based at least on one or more signals (e.g., control signaling) received from the second wireless device 804. In some aspects, the first wireless device 802 may determine that the second wireless device 804 is a half duplex device or a full duplex device based on control signals received from the second wireless device 804. In some aspects, the first wireless device 802 may comprise one or more TRPs. The first wireless device 802 may operate as a full duplex device. In such aspects, the first wireless device 802 may comprise a first TRP that is a transmit panel and a second TRP that is a receive panel. In some aspects, the one or more TRPs of the first wireless device 802 may share a common modem. For example, resource selection for transmission at the first TRP may be determined at the shared common modem based on reception at the second TRP. In some aspects, the first wireless device 802 may operate as two independent half duplex devices. In some aspects, the first TRP and the second TRP of the one or more TRPs may each have a corresponding modem and share an application processor. For example, resource selection/reservation may be determined independently at the respective corresponding modems of the first TRP and the second TRP, while the first and second TRPs share the application processor. In some aspects, the first TRP and the second TRP of the one or more TRPs may each have a corresponding modem and share a central modem. The central modem may provide resource availability for the individual modems associated with the first TRP and the second TRP. In some aspects, the central modem may receive allocation requests from the modems associated with the first TRP and the second TRP. The central modem may provide the resource availability to the first modem associated with the first TRP and to the second modem associated with the second TRP based on the allocation requests from the first TRP and/or the second TRP. In some aspects, the first wireless device 802 may operate as a full duplex device. The first TRP may be a transmit panel of the full duplex device, and the second TRP may be a receive panel of the full duplex device.

In some aspects, for example as illustrated at 808, the first wireless device 802 may report a duplex capability of the first wireless device 802 to the second wireless device 804. For example, the first wireless device 802 may transmit, to the second wireless device 804, an indication of the duplex capability of the first wireless device. The second wireless device 804 may receive the report (e.g., indication) of the duplex capability from the first wireless device 802. The duplex capability may comprise a duplex configuration that may be supported by the first wireless device 802. For example, the first wireless device 802 may be operating as two or more half duplex UEs and may transmit in the duplex capability, to the second wireless device 804, the ability to operate in either a half duplex configuration or a full duplex configuration.

In some aspects, for example as illustrated at 810, the second wireless device 804 may transmit a request to operate in a duplex configuration supported by the first wireless device 802. The second wireless device may transmit the request to the first wireless device 802. The first wireless device 802 may receive the request from the second wireless device 804. In some aspects, the second wireless device 804 may support at least one of a full duplex configuration or a half duplex configuration. The request may include at least one of the full duplex configuration or the half duplex configuration. In some aspects, the second wireless device 802 may be operating as a half duplex UE, but may be capable of operating as either a half duplex UE or a full duplex UE receives the duplex capability from the first wireless device 802. In some aspects, the request from the second wireless device 804 may request that the first wireless device 802 change their mode of operation from half duplex to full duplex.

As illustrated at 812, the first wireless device 802 may determine a duplex configuration of the second wireless device 804. In some aspects, the first wireless device 802 may determine the duplex configuration of the second wireless device 804 based on the request received from the second wireless device 804. In some aspects, the second wireless device 804 may transmit signaling to the first wireless device 802 which indicates or advertises the duplex configuration of the second wireless device 804. For example, the second wireless device 804 may transmit a duplex capability to the first wireless device 802.

As illustrated at 814, the first wireless device 802 may enable a duplex configuration of the first wireless device 802 to correspond with the duplex configuration of the second wireless device 804. In some aspects, the duplex configuration supported by the first wireless device 802 may comprise at least one of a full duplex configuration or a half duplex configuration.

In some aspects, the first wireless device 802 may transmit, to the second wireless device 804, a confirmation to acknowledge the request. The second wireless device may receive the confirmation to acknowledge the request from the first wireless device 802.

As illustrated at 816, the second wireless device 804 may enable a duplex configuration to correspond with the duplex configuration of the first wireless device 802 in response to receiving the confirmation from the first wireless device 802. For example, both the first wireless device 802 and the second wireless device 804 may change their mode of operation from half duplex to full duplex in response to the request.

In some aspects, the first wireless device 802 may operate as a full duplex UE may infer the presence of half duplex only UEs in the vicinity of the first wireless device 802 based on control signaling received by the first wireless device 802. In such aspects, to operate in an efficient manner, the first wireless device 802 may change its mode of operation from full duplex to one or more half duplex UEs, as shown for example in FIGS. 6A, 6B, and 7. In some aspects, the first wireless device 802 may be operating as a half duplex UE, but may be capable of operating as a full duplex UE, may infer the presence of full duplex only UEs in the vicinity of the first wireless device 802 and may change its mode of operation from half duplex to full duplex.

As illustrated at 818, first wireless device 802 and the second wireless device 804 may communicate with each other. The first wireless device 802 and the second wireless device 804 may communicate with each other based on the duplex configuration indicated in the request or of the second wireless device 804 as determined by the first wireless device 802.

Figure 9:
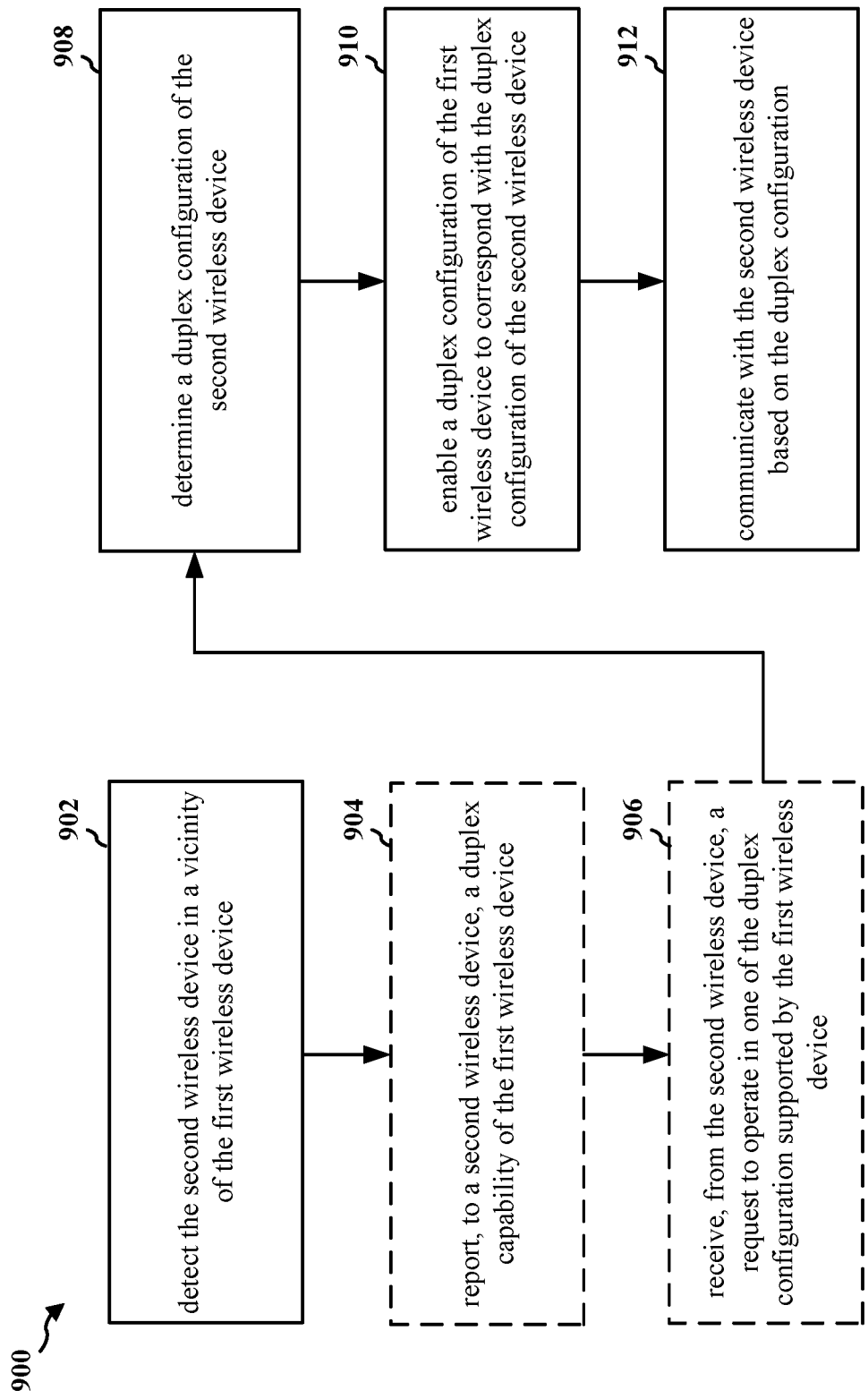
FIG. 9 is a flowchart of a method of wireless communication.

FIG. 9 is a flowchart 900 of a method of wireless communication. The method is performed by a wireless device or a component of a wireless device (e.g., the UE 104, device 310, the apparatus 1002; the cellular baseband processor 1004, which may include the memory 360 and which may be the entire device 350 or a component of the device, such as the TX processor 368, the RX processor 356, and/or the controller/processor 359). Among other examples, the wireless device may comprise a second UE. According to various aspects, one or more of the illustrated operations of the method 900 may be omitted, transposed, and/or contemporaneously performed. Optional aspects are illustrated with a dashed line. The method may enable a wireless device having one or more TRPs to configure the one or more TRPs based on configurations of other wireless devices.

At 902, the first wireless device may detect a second wireless device in a vicinity of the first wireless device. For example, 902 may be performed by detection component 1040 of apparatus 1002. The first wireless device may detect the presence of the second wireless device in the vicinity of the first wireless device based at least on one or more signals (e.g., control signaling) received from the second wireless device. In some aspects, the first wireless device may determine that the second wireless device is a half duplex device or a full duplex device based on control signals received from the second wireless device. In some aspects, the first wireless device may comprise one or more TRPs. The first wireless device may operate as a full duplex device. In such aspects, the first wireless device may comprise a first TRP that is a transmit panel and a second TRP that is a receive panel. In some aspects, the one or more TRPs of the first wireless device may share a common modem. For example, resource selection for transmission at the first TRP may be determined at the shared common modem based on reception at the second TRP. In some aspects, the first wireless device may operate as two independent half duplex devices. In some aspects, the first TRP and the second TRP of the one or more TRPs may each have a corresponding modem and share an application processor. For example, resource selection/reservation may be determined independently at the respective corresponding modems of the first TRP and the second TRP, while the first and second TRPs share the application processor. In some aspects, the first TRP and the second TRP of the one or more TRPs may each have a corresponding modem and share a central modem. The central modem may provide resource availability for the individual modems associated with the first TRP and the second TRP. In some aspects, the central modem may receive allocation requests from the modems associated with the first TRP and the second TRP. The central modem may provide the resource availability to the first modem associated with the first TRP and to the second modem associated with the second TRP based on the allocation requests from the first TRP and/or the second TRP. In some aspects, the first wireless device may operate as a full duplex device. The first TRP may be a transmit panel of the full duplex device, and the second TRP may be a receive panel of the full duplex device.

In some aspects, for example at 904, the first wireless device may report a duplex capability of the first wireless device. For example, 904 may be performed by capability component 1042 of apparatus 1004. The first wireless device may report the duplex capability of the first wireless device to the second wireless device. The duplex capability may comprise a duplex configuration that may be supported by the first wireless device. The first wireless device may report the duplex capability by transmitting, to the second wireless device, an indication of the duplex capability of the first wireless device.

In some aspects, for example at 906, the first wireless device may receive a request to operate in one of the duplex configurations supported by the first wireless device. For example, 906 may be performed by request component 1044 of apparatus 1002. The first wireless device may receive the request to operate in the one of the duplex configurations supported by the first wireless device from the second wireless device. In some aspects, the second wireless device may support at least one of a full duplex configuration or a half duplex configuration. The request to operate may include at least one of the full duplex configuration or the half duplex configuration.

At 908, the first wireless device may determine a duplex configuration of the second wireless device. For example, 908 may be performed by determination component 1046 of apparatus 1002. In some aspects, the first wireless device may determine the duplex configuration of the second wireless device based on the request received from the second wireless device. In some aspects, the second wireless device may transmit signaling to the first wireless device which indicates or advertises the duplex configuration of the second wireless device. For example, the second wireless device may transmit a duplex capability to the first wireless device.

At 910, the first wireless device may enable a duplex configuration of the first wireless device to correspond with the duplex configuration of the second wireless device. For example, 910 may be performed by duplex component 1048 of apparatus 1002. In some aspects, the duplex configuration supported by the first wireless device may comprise at least one of a full duplex configuration or a half duplex configuration.

At 912, the first wireless device may communicate with the second wireless device. For example, 912 may be performed by communication component 1050 of apparatus 1002. The first wireless device may communicate with the second wireless device based on the duplex configuration.

Figure 10:
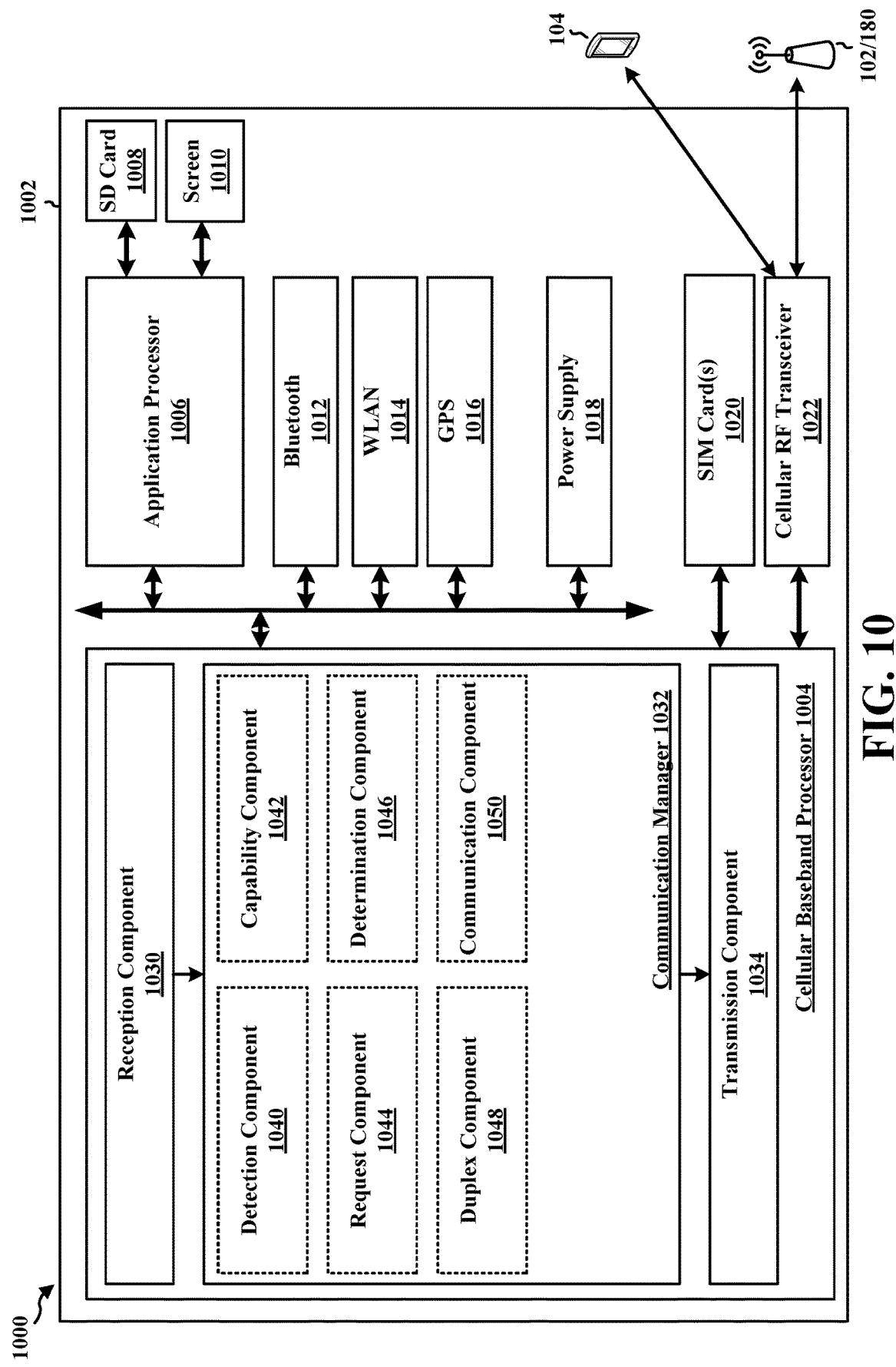
FIG. 10 is a diagram illustrating an example of a hardware implementation for an apparatus employing a processing system.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the cellular baseband processor 1004, and in another configuration, the apparatus 1002 may be the entire UE (e.g., see 350 of FIG. 3) and include the aforediscussed additional modules of the apparatus 1002.

The communication manager 1032 includes a detection component 1040 that is configured to detect a second wireless device in a vicinity of the first wireless device, e.g., as described in connection with 902 of FIG. 9. The communication manager 1032 further includes a capability component 1042 that is configured to report a duplex capability of the first wireless device, e.g., as described in connection with 904 of FIG. 9. The communication manager 1032 further includes a request component 1044 that is configured to receive a request to operate in one of the duplex configurations supported by the first wireless device, e.g., as described in connection with 906 of FIG. 9. The communication manager 1032 further includes a determination component 1046 that is configured to determine a duplex configuration of the second wireless device, e.g., as described in connection with 908 of FIG. 9. The communication manager 1032 further includes a duplex component 1048 that is configured to enable a duplex configuration of the first wireless device to correspond with the duplex configuration of the second wireless device, e.g., as described in connection with 910 of FIG. 9. The communication manager 1032 further includes a communication component 1050 that is configured to communicate with the second wireless device, e.g., as described in connection with 912 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for detecting a second wireless device in a vicinity of the first wireless device. The apparatus includes means for determining a duplex configuration of the second wireless device. The apparatus includes means for enabling a duplex configuration of the first wireless device to correspond with the duplex configuration of the second wireless device. The apparatus includes means for communicating with the second wireless device based on the duplex configuration. The apparatus further includes means for reporting, to the second wireless device, a duplex capability of the first wireless device. The duplex capability comprises a duplex configuration supported by the first wireless device. The apparatus further includes means for receiving, from the second wireless device, a request to operate in one of the duplex configuration supported by the first wireless device. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
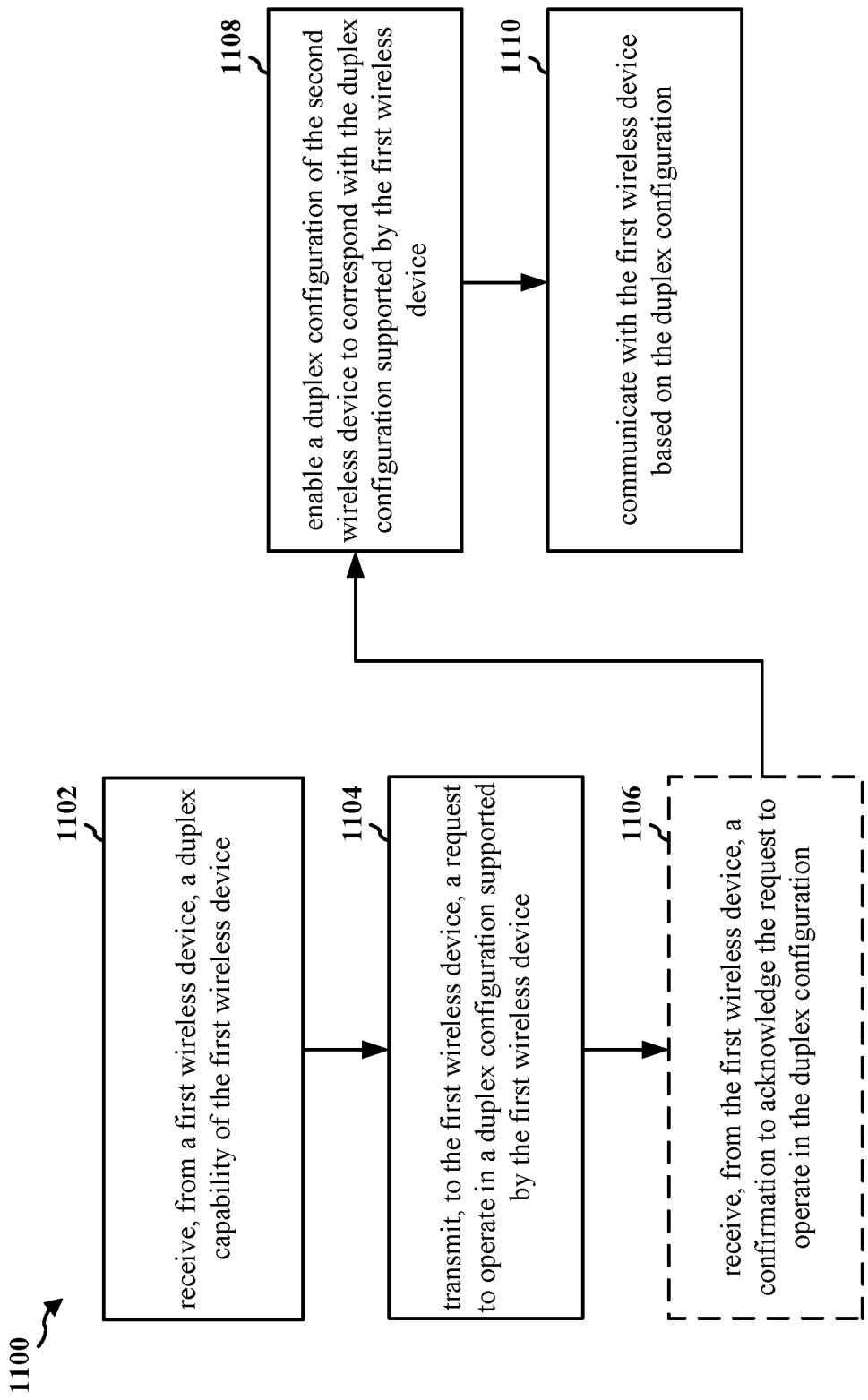
FIG. 11 is a flowchart of a method of wireless communication.

FIG. 11 is a flowchart 1100 of a method of wireless communication. The method may be performed by a UE or a component of a UE (e.g., the UE 104'; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted transposed, or contemporaneous. Optional aspects are illustrated with a dashed line. The method may enable a wireless device to request to operate in a duplex configuration supported by another wireless device.

At 1102, the second wireless device may receive an indication of a duplex capability of a first wireless device. For example, 1102 may be performed by capability component 1240 of apparatus 1202. The second wireless device may receive the indication of the duplex capability from the first wireless device. The second wireless device may receive the duplex capability from the first wireless device. In some aspects, the duplex capability of the first wireless device may comprise a duplex configuration supported by the first wireless device. In some aspects, the first wireless device may support at least one of a full duplex configuration or a half duplex configuration.

At 1104, the second wireless device may transmit a request to operate in a duplex configuration supported by the first wireless device. For example, 1104 may be performed by request component 1242 of apparatus 1204. The second wireless device may transmit the request to the first wireless device. In some aspects, the second wireless device may support at least one of a full duplex configuration or a half duplex configuration. The request may include at least one of the full duplex configuration or the half duplex configuration.

In some aspects, for example at 1106, the second wireless device may receive a confirmation to acknowledge the request to operate in the duplex configuration. For example, 1106 may be performed by confirmation component 1244 of apparatus 1202. The second wireless device may receive the confirmation from the first wireless device. In some aspects, the second wireless device may enable a duplex configuration to correspond with the duplex configuration of the first wireless device in response to receiving the confirmation from the first wireless device.

At 1108, the second wireless device may enable a duplex configuration of the second wireless device. For example, 1108 may be performed by duplex component 1246 of apparatus 1202. The second wireless device may enable the duplex configuration of the second wireless device that corresponds with the duplex configuration supported by the first wireless device. In some aspects, the duplex configuration supported by the first wireless device may comprise at least one of a full duplex configuration or a half duplex configuration.

At 1110, the second wireless device may communicate with the first wireless device.

For example, 1110 may be performed by communication component 1248 of apparatus 1202. The second wireless device may communicate with the first wireless device based on the duplex configuration.

Figure 12:
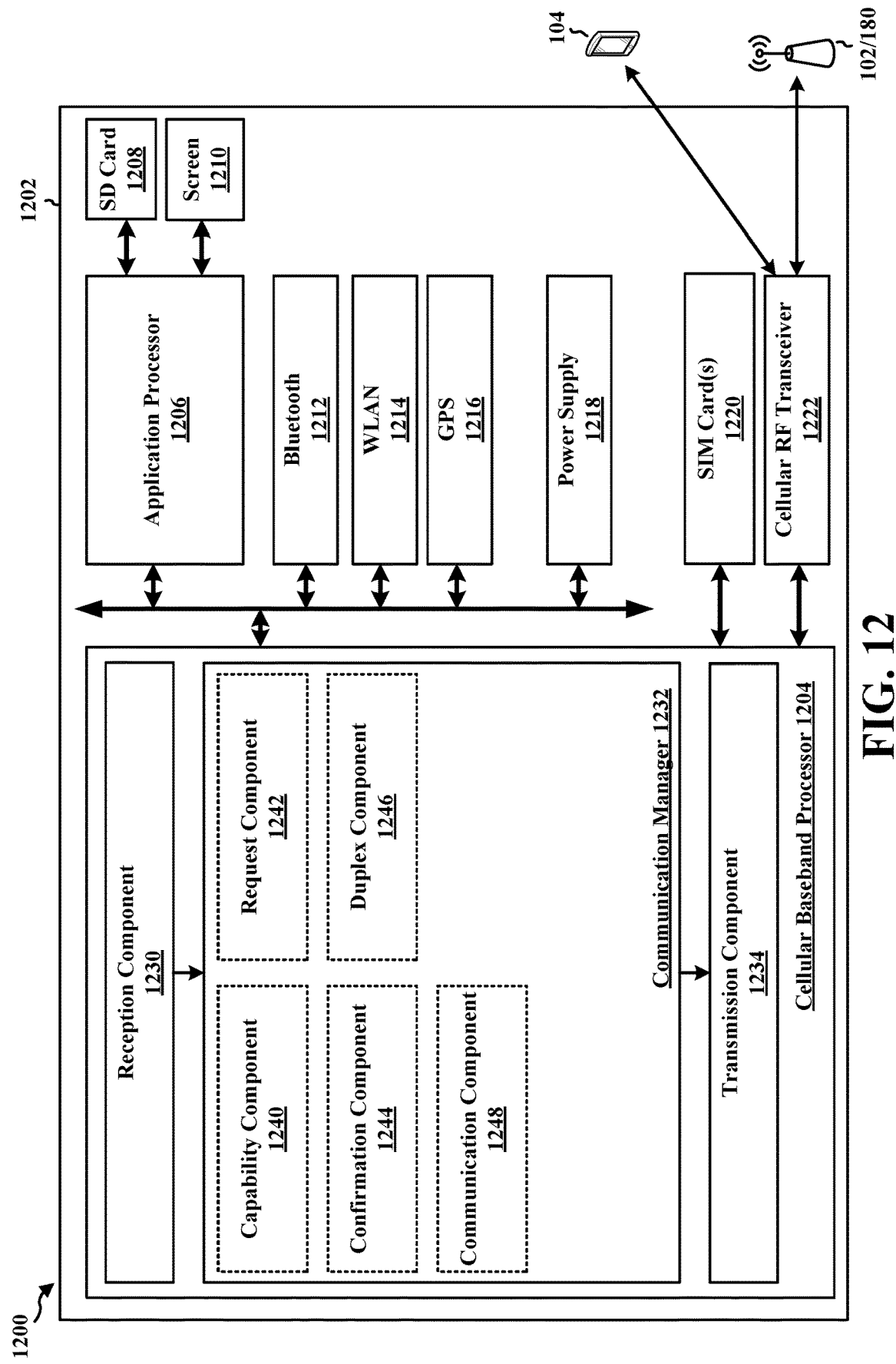
FIG. 12 is a diagram illustrating an example of a hardware implementation for an apparatus employing a processing system.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the cellular baseband processor 1204, and in another configuration, the apparatus 1202 may be the entire UE (e.g., see 350 of FIG. 3) and include the aforediscussed additional modules of the apparatus 1202.

The communication manager 1232 includes a capability component 1240 that is configured to receive an indication of a duplex capability of a first wireless device, e.g., as described in connection with 1102 of FIG. 11. The communication manager 1232 further includes a request component 1242 that is configured to transmit a request to operate in a duplex configuration supported by the first wireless device, e.g., as described in connection with 1104 of FIG. 11. The communication manager 1232 further includes a confirmation component 1244 that is configured to receive a confirmation to acknowledge the request to operate in the duplex configuration, e.g., as described in connection with 1106 of FIG. 11. The communication manager 1232 further includes a duplex component 1246 that is configured to enable a duplex configuration of the second wireless device, e.g., as described in connection with 1108 of FIG. 11. The communication manager 1232 further includes a communication component 1248 that is configured to communicate with the first wireless device, e.g., as described in connection with 1110 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a first wireless device, a duplex capability of the first wireless device. The apparatus includes means for transmitting, to the first wireless device, a request to operate in a duplex configuration supported by the first wireless device. The apparatus includes means for enabling a duplex configuration of the second wireless device to correspond with the duplex configuration supported by the first wireless device. The apparatus includes means for communicating with the first wireless device based on the duplex configuration. The apparatus further includes means for receiving, from the first wireless device, a confirmation to acknowledge the request to operate in the duplex configuration. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a first wireless device comprising detecting a second wireless device in a vicinity of the first wireless device; determining a duplex configuration of the second wireless device; enabling a duplex configuration of the first wireless device to correspond with the duplex configuration of the second wireless device; and communicating with the second wireless device based on the duplex configuration.

In Aspect 2, the method of Aspect 1 further includes reporting, to the second wireless device, a duplex capability of the first wireless device, wherein the duplex capability comprises a duplex configuration supported by the first wireless device.

In Aspect 3, the method of Aspect 1 or 2 further includes that the duplex configuration supported by the first wireless device comprises at least one of a full duplex configuration or a half duplex configuration.

In Aspect 4, the method of any of Aspects 1-3 further includes receiving, from the second wireless device, a request to operate in one of the duplex configuration supported by the first wireless device.

In Aspect 5, the method of any of Aspects 1-4 further includes that the second wireless device supports at least one of a full duplex configuration or a half duplex configuration, wherein the request includes at least one of the full duplex configuration or the half duplex configuration.

In Aspect 6, the method of any of Aspects 1-5 further includes that the first wireless device comprises one or more TRPs.

In Aspect 7, the method of any of Aspects 1-6 further includes that the first wireless device operates as a full duplex device, wherein a first TRP is a transmit panel and a second TRP is a receive panel.

In Aspect 8, the method of any of Aspects 1-7 further includes that the one or more TRPs share a common modem.

In Aspect 9, the method of any of Aspects 1-8 further includes that the first wireless device operates as two independent half duplex devices.

In Aspect 10, the method of any of Aspects 1-9 further includes that a first TRP and a second TRP of the one or more TRPs each have a corresponding modem and share an application processor In Aspect 11, the method of any of Aspects 1-10 further includes that a first TRP and a second TRP of the one or more TRPs each have a corresponding modem and share a central modem, wherein the central modem provides resource availability for the individual modems associated to the first TRP and the second TRP.

In Aspect 12, the method of any of Aspects 1-11 further includes that the central modem receives allocation requests from modems associated to the first TRP and the second TRP, wherein the central modem provides the resource availability to a first modem associated with the first TRP and a second modem associated with the second TRP based on the allocation requests from the first TRP and the second TRP.

In Aspect 13, the method of any of Aspects 1-12 further includes that the first wireless device operates as a full duplex device, wherein the first TRP is a transmit panel of the full duplex device and the second TRP is a receive panel of the full duplex device.

In Aspect 14, the method of any of Aspects 1-13 further includes that the first wireless device determines that the second wireless device is a half duplex device or a full duplex device based on control signals received from the second wireless device.

Aspect 15 is a system or apparatus including means for implementing a method or realizing an apparatus as in any of Aspects 1-14.

Aspect 16 is a system including one or more processor and memory in electronic communication with the one or more processors to cause the system or apparatus to implement a method as in any of Aspects 1-14.

Aspect 17 is a non-transitory computer readable medium storing instructions executable by one or more processors to cause the one or more processors to implement a method as in any of Aspects 1-14.

Aspect 18 is a method of wireless communication at a second wireless device comprising receiving, from a first wireless device, an indication of a duplex capability of the first wireless device; transmitting, to the first wireless device, a request to operate in a duplex configuration supported by the first wireless device; enabling a duplex configuration of the second wireless device to correspond with the duplex configuration supported by the first wireless device; and communicating with the first wireless device based on the duplex configuration.

In Aspect 19, the method of Aspect 18 further includes that the duplex capability of the first wireless device comprises the duplex configuration supported by the first wireless device.

In Aspect 20, the method of Aspect 18 or 19 further includes that the first wireless device supports at least one of a full duplex configuration or a half duplex configuration.

In Aspect 21, the method of any of Aspects 18-20 further includes that the second wireless device supports at least one of a full duplex configuration or a half duplex configuration, wherein the request includes at least one of the full duplex configuration or the half duplex configuration.

In Aspect 22, the method of any of Aspects 18-21 further includes receiving, from the first wireless device, a confirmation to acknowledge the request to operate in the duplex configuration.

In Aspect 23, the method of any of Aspects 18-22 further includes that the second wireless device enables the duplex configuration to correspond with the duplex configuration of the first wireless device in response to receiving the confirmation from the first wireless device.

Aspect 24 is a system or apparatus including means for implementing a method or realizing an apparatus as in any of Aspects 18-23.

Aspect 25 is a system including one or more processor and memory in electronic communication with the one or more processors to cause the system or apparatus to implement a method as in any of Aspects 18-23.

Aspect 26 is a non-transitory computer readable medium storing instructions executable by one or more processors to cause the one or more processors to implement a method as in any of Aspects 18-23.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first wireless device, comprising:
   detecting a second wireless device in a vicinity of the first wireless device, wherein one or more transmission reception points (TRPs) of the first wireless device detect the second wireless device in the vicinity of the first wireless device;
   determining a duplex configuration of the second wireless device;
   enabling a duplex configuration of the first wireless device to correspond with the duplex configuration of the second wireless device; and
   communicating with the second wireless device based on the duplex configuration.

2. The method of claim 1, further comprising:
   reporting, to the second wireless device, a duplex capability of the first wireless device, wherein the duplex capability comprises the duplex configuration supported by the first wireless device.

3. The method of claim 1, wherein the duplex configuration supported by the first wireless device comprises at least one of a full duplex configuration or a half duplex configuration.

4. The method of claim 1, further comprising:
   receiving, from the second wireless device, a request to operate in one of the duplex configuration supported by the first wireless device.

5. The method of claim 4, wherein the second wireless device supports at least one of a full duplex configuration or a half duplex configuration, wherein the request includes at least one of the full duplex configuration or the half duplex configuration.

6. The method of claim 1, wherein the first wireless device operates as a full duplex device, wherein a first TRP is a transmit panel and a second TRP is a receive panel.

7. The method of claim 1, wherein the one or more TRPs share a common modem.

8. The method of claim 1, wherein the first wireless device operates as two independent half duplex devices.

9. The method of claim 8, wherein a first TRP and a second TRP of the one or more TRPs each have a corresponding modem and share an application processor.

10. The method of claim 8, wherein a first TRP and a second TRP of the one or more TRPs each have a corresponding modem and share a central modem, wherein the central modem provides resource availability for individual modems associated to the first TRP and the second TRP.

11. A method of wireless communication at a first wireless device, comprising:
   detecting a second wireless device in a vicinity of the first wireless device;
   determining a duplex configuration of the second wireless device;
   enabling a duplex configuration of the first wireless device to correspond with the duplex configuration of the second wireless device; and
   communicating with the second wireless device based on the duplex configuration,
   wherein the first wireless device comprises one or more transmission reception points (TRPs), wherein the first wireless device operates as two independent half duplex devices, wherein a first TRP and a second TRP of the one or more TRPs each have a corresponding modem and share a central modem, wherein the central modem provides resource availability for individual modems associated to the first TRP and the second TRP, wherein the central modem receives allocation requests from modems associated to the first TRP and the second TRP, wherein the central modem provides the resource availability to a first modem associated with the first TRP and a second modem associated with the second TRP based on the allocation requests from the first TRP and the second TRP.

12. The method of claim 10, wherein the first wireless device operates as a full duplex device, wherein the first TRP is a transmit panel of the full duplex device and the second TRP is a receive panel of the full duplex device.

13. The method of claim 1, wherein the first wireless device determines that the second wireless device is a half duplex device or a full duplex device based on control signals received from the second wireless device.

14. An apparatus for wireless communication at a first wireless device, comprising:
   a memory; and
   at least one processor coupled to the memory and configured to:
     detect a second wireless device in a vicinity of the first wireless device, wherein one or more transmission reception points (TRPs) of the first wireless device detect the second wireless device in the vicinity of the first wireless device;
     determine a duplex configuration of the second wireless device;

enable a duplex configuration of the first wireless device to correspond with the duplex configuration of the second wireless device; and communicate with the second wireless device based on the duplex configuration.

15. The apparatus of claim 14, wherein the at least one processor is further configured to:

report, to the second wireless device, a duplex capability of the first wireless device, wherein the duplex capability comprises the duplex configuration supported by the first wireless device.

16. The apparatus of claim 14, wherein the duplex configuration supported by the first wireless device comprises at least one of a full duplex configuration or a half duplex configuration.

17. The apparatus of claim 14, wherein the at least one processor is further configured to:

receive, from the second wireless device, a request to operate in one of the duplex configuration supported by the first wireless device.

18. The apparatus of claim 17, wherein the second wireless device supports at least one of a full duplex configuration or a half duplex configuration, wherein the request includes at least one of the full duplex configuration or the half duplex configuration.

19. The apparatus of claim 14, wherein the first wireless device operates as a full duplex device, wherein a first TRP is a transmit panel and a second TRP is a receive panel.

20. The apparatus of claim 14, wherein the first wireless device operates as two independent half duplex devices.

21. The apparatus of claim 14, wherein the first wireless device determines that the second wireless device is a half duplex device or a full duplex device based on control signals received from the second wireless device.

22. A method of wireless communication at a second wireless device, comprising:

receiving, from a first wireless device, an indication of a duplex capability of the first wireless device;

transmitting, to the first wireless device, a request to operate in a duplex configuration supported by the first wireless device;

enabling a duplex configuration of the second wireless device to correspond with the duplex configuration supported by the first wireless device; and communicating with the first wireless device based on the duplex configuration.

23. The method of claim 22, wherein the duplex capability of the first wireless device comprises the duplex configuration supported by the first wireless device.

24. The method of claim 23, wherein the first wireless device supports at least one of a full duplex configuration or a half duplex configuration.

25. The method of claim 22, wherein the second wireless device supports at least one of a full duplex configuration or a half duplex configuration, wherein the request includes at least one of the full duplex configuration or the half duplex configuration.

26. The method of claim 22, further comprising:

receiving, from the first wireless device, a confirmation to acknowledge the request to operate in the duplex configuration.

27. The method of claim 26, wherein the second wireless device enables the duplex configuration to correspond with the duplex configuration of the first wireless device in response to receiving the confirmation from the first wireless device.

28. An apparatus for wireless communication at a second wireless device, comprising:

a memory; and at least one processor coupled to the memory and configured to:

receive, from a first wireless device, an indication of a duplex capability of the first wireless device;

transmit, to the first wireless device, a request to operate in a duplex configuration supported by the first wireless device;

enable a duplex configuration of the second wireless device to correspond with the duplex configuration supported by the first wireless device; and communicate with the first wireless device based on the duplex configuration.

\* \* \* \* \*